United States Patent [19]

Hiyousu et al.

[11] Patent Number: 5,321,091
[45] Date of Patent: Jun. 14, 1994

[54] BINDER RESIN USED IN A TONER

[75] Inventors: Yoshihiko Hiyousu, Machida; Seiichi Takagi, Yokohama, both of Japan

[73] Assignee: Canon Kabushiki Kaisha, Tokyo, Japan

[21] Appl. No.: 978,443

[22] Filed: Nov. 18, 1992

Related U.S. Application Data

[63] Continuation of Ser. No. 530,188, May 25, 1990, abandoned.

[30] Foreign Application Priority Data

May 29, 1989 [JP] Japan .................................. 1-132739
May 30, 1989 [JP] Japan .................................. 1-134685

[51] Int. Cl.$^5$ ..................... C08F 257/02; G03G 13/08
[52] U.S. Cl. ...................... 525/244; 525/260; 525/263; 525/267; 525/308; 525/309; 525/242; 430/107
[58] Field of Search ............... 525/242, 260, 263, 267, 525/308, 309; 430/107

[56] References Cited

U.S. PATENT DOCUMENTS

| | | |
|---|---|---|
| 2,221,776 | 11/1940 | Carlson . |
| 2,297,691 | 10/1942 | Carlson . |
| 2,618,552 | 11/1952 | Wise . |
| 2,874,063 | 2/1959 | Greig . |
| 3,666,363 | 5/1972 | Tanaka et al. ...................... 355/17 |
| 3,909,258 | 9/1975 | Kotz . |
| 4,071,361 | 1/1978 | Marushima ........................... 96/1.4 |
| 4,237,257 | 12/1980 | Moriya et al. ..................... 526/227 |
| 4,499,168 | 2/1985 | Mitsuhashi ......................... 430/109 |
| 4,939,060 | 7/1990 | Tomiyama et al. ................. 430/109 |
| 4,966,829 | 10/1990 | Yasuda et al. ..................... 430/109 |
| 5,071,918 | 12/1991 | Funato et al. ..................... 525/273 |

FOREIGN PATENT DOCUMENTS

| | | |
|---|---|---|
| 56-8416 | 1/1981 | Japan . |
| 58-86558 | 5/1983 | Japan . |
| 60-166958 | 8/1985 | Japan . |
| 2078385 | 1/1982 | United Kingdom . |

*Primary Examiner*—Vasu S. Jagannathan
*Attorney, Agent, or Firm*—Fitzpatrick, Cella, Harper & Scinto

[57] ABSTRACT

A toner for developing electrostatic images contains a binder resin and a colorant or a magnetic material. The binder is prepared by polymerizing ethylenically unsaturated monomer(s) in the presence of less than 0.1% by weight of the monomer(s) of a radical polymerization initiator. The resulting polymer or copolymer is dissolved in a polymerizable monomer and solution or suspension polymerized with a radical polymerization initiator. The resulting binder resin is substantially free of fragments of radical polymerization initiator which tend to bond to molecular chain terminals.

18 Claims, 6 Drawing Sheets

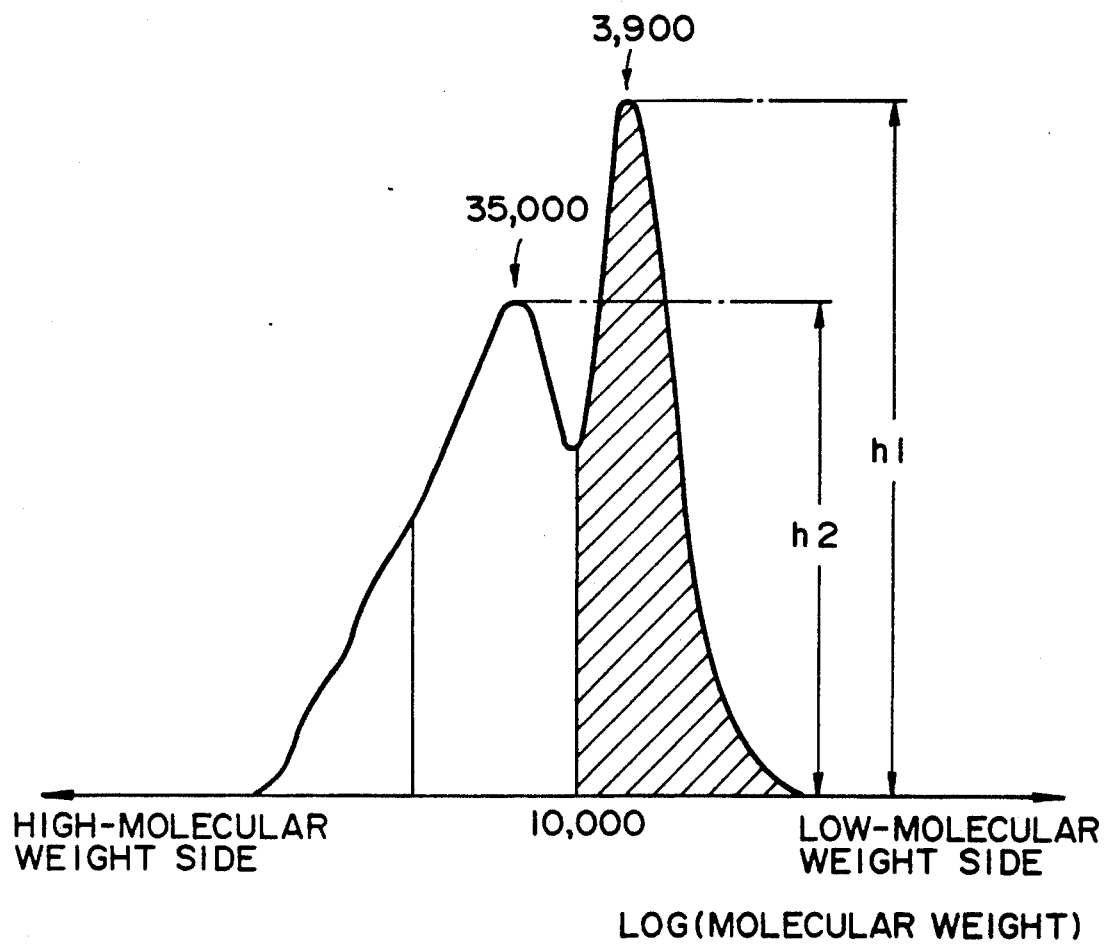
GPC CHROMATOGRAM OF THF-SOLUBLE MATTER
OF RESIN COMPOSITION IN EXAMPLE 1
F I G. 1

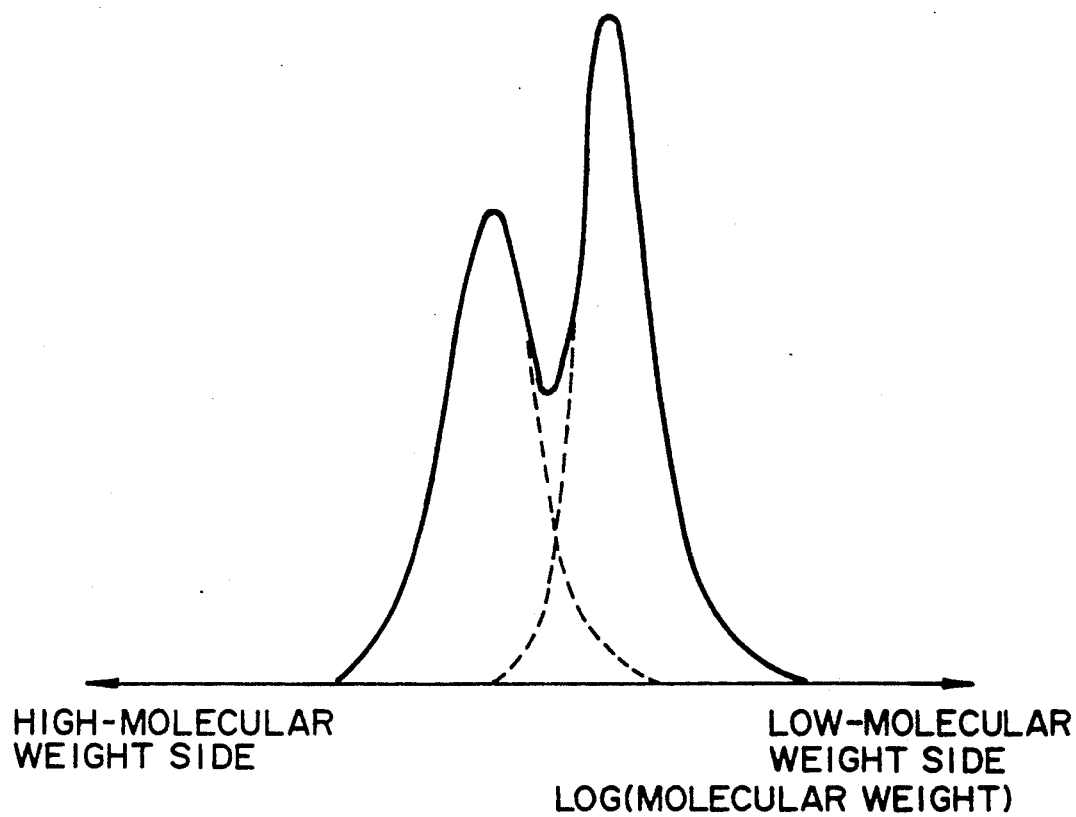
HIGH-MOLECULAR
WEIGHT SIDE
LOW-MOLECULAR
WEIGHT SIDE
LOG(MOLECULAR WEIGHT)
F I G. 4
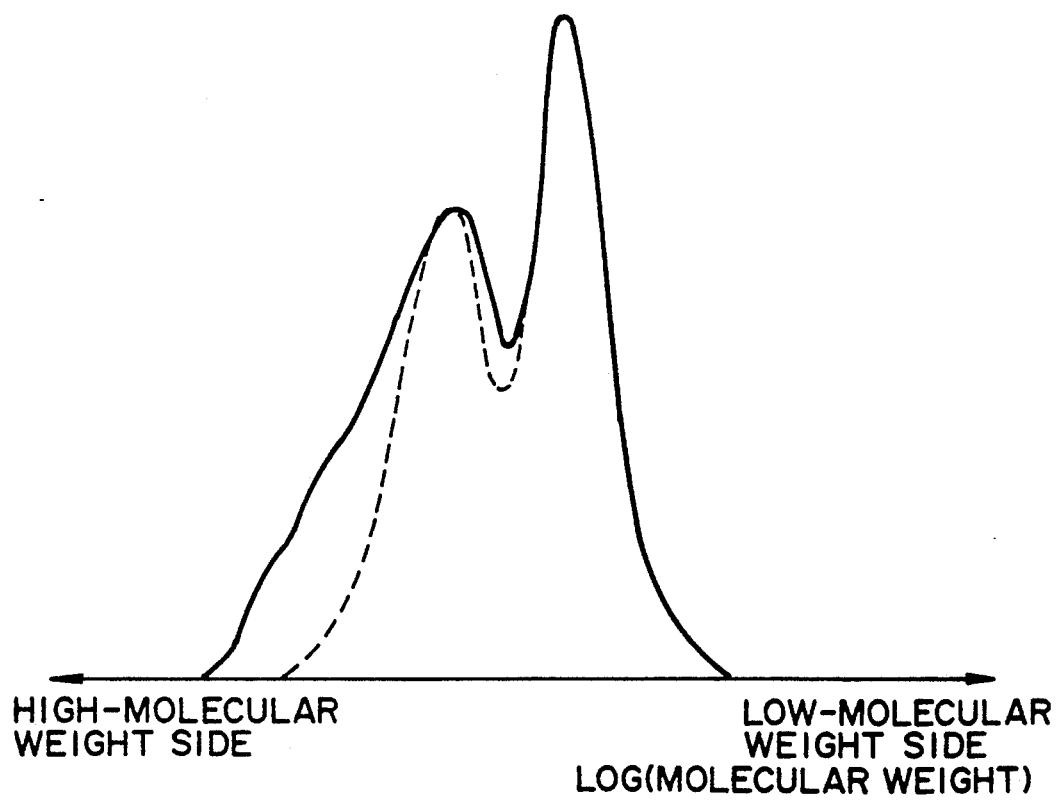
HIGH-MOLECULAR
WEIGHT SIDE
LOW-MOLECULAR
WEIGHT SIDE
LOG(MOLECULAR WEIGHT)
F I G. 5

BINDER RESIN USED IN A TONER

This application is a continuation of application Ser. No. 07/530,188 filed May 25, 1990, now abandoned.

BACKGROUND OF THE INVENTION

1. Field of the Invention

The present invention relates to a process for preparing a binder resin used in a toner which is used in a dry developer used for an image forming process such as electrophotography, electrostatic recording or magnetic recording.

2. Related Background Art

A large number of methods have been conventionally known as electrophotography, as disclosed in U.S. Pat. No. 2,297,691, Japanese Patent Publications No. 42-23910 and No. 43-24748 and so forth. In general, copies are obtained by forming an electrostatic latent image on a photosensitive member, utilizing a photoconductive material and according to various means, subsequently developing the latent image by the use of a toner, and transferring the toner image to a transfer medium such as paper if necessary, followed by fixing by the action of heat, pressure, heat-and-pressure, or solvent vapor. In the case when the process comprises a toner-image transfer step, the process is usually provided with the step of removing the toner remaining on a photosensitive member.

As developing processes in which an electrostatic latent image is formed into a visible image by the use of a toner, known methods include the magnetic brush development as disclosed in U.S. Pat. No. 2,874,063, the cascade development as disclosed in U.S. Pat. No. 2,618,552, the powder cloud development as disclosed in U.S. Pat. No. 2,221,776, and the method in which a conductive magnetic toner is used, as disclosed in U.S. Pat. No. 3,909,258.

As toners used in these development processes, fine powder obtained by dispersing a dye and/or pigment in a natural or synthetic resin has been hitherto used. For example, particles formed by finely grinding a binder resin such as polystyrene comprising a colorant dispersed therein, to have a size of about 1 to 30$\mu$ are used as the toner. A toner incorporated with magnetic material particles such as magnetite is also used as the magnetic toner. On the other hand, in a system in which a two-component type developer is used, the toner is usually used by mixture with carrier particles such as glass beads, ion powder and ferrite particles.

Nowadays, such recording processes have been widely utilized not only in commonly available copying machines, but also in printers that output information from a computer, or for the printing of microfilms. Accordingly, a higher performance has become required, and the above recording processes have now been required to simultaneously achieve the improvements in performance such that an apparatus is made more small-sized, more lightweight, more low energy, more high-speed, more maintenance-free, and more personal. In order to meet these requirements, the needs on toners have become severer in various aspects. For example, when the copying machines or printers are made small-sized, heat sources such as heat-fixing units and exposure lamps are squeezed into a narrow space, so that the temperature inside the machine tends to be higher. Hence, toners must be made to have an improved blocking resistance. In order to make the copying machines or printers lightweight, a fixing roller is so designed as to be more thin-walled and slender, and a cleaning mechanism of the fixing roller or a cleaning mechanism of a photosensitive member ends to be more simple and lightweight. Thus, there is a tendency that the machine is provided with no applicator used for applying an anti-offset oil to a fixing unit. This makes it necessary to improve fixing properties of toners, offset resistance thereof, and cleaning resistance of photosensitive members. In order to make the copying machines or printers more energy efficient (specifically stated, to make them consume less power) or to make them more high-speed, the fixing properties of toners must be improved. In addition, in order to make the copying machines or printers more personal, the reliability must be improved, and it becomes important to eliminate paper jam. The paper jam may commonly often occur when a transfer sheet e.g., copy paper) winds around a roller, and thus it becomes necessary for toners to be capable of suppressing the winding of paper around a fixing roller. However, as shown in FIG. 6, the performance required when a toner is prepared and the properties of a toner itself often conflict with each other.

The needs on toners are severe as will be seen from the above examples, and it is difficult to meet the requirements unless these performance features and properties are simultaneously improved. However, it would be ridiculous if the achievement of these improvements results in lowering of development performance such as image quality and durability of toners, and production efficiency of toners.

These greatly depend on the performance of the binder resin used in toners. It has been proposed to improve the characteristics of a toner by the use of a release agent, a plasticizer or other additives. Use of these, however, is a supplementary means.

Various methods have been proposed for the improvement of binder resins used in toners.

For example, Japanese Patent Application Laid-Open No. 6-158340 (corresponding to British Patent No. 2,078,385) proposes a toner containing a binder resin comprised of a low-molecular polymer and a high-molecular polymer. In order to improve the offset resistance of toners, it is necessary to make larger the molecular weight of the high-molecular polymer or to increase the proportion of the high-molecular polymer. In such an instance, the grindability of a toner is so extremely lowered that it is difficult to obtain a product satisfactory from a practical viewpoint.

Japanese Patent Application Laid-open No. 58-86558 proposes a toner blended with a polymer cross-linked with a low-molecular polymer, which is a toner comprising a low-molecular polymer and an insoluble infusible high-molecular polymer as main resin components. In this toner, the fixing properties and grindability are presumed to be improved. However, it is difficult to satisfy both the offset resistance and grindability in a high performance, because the weight average molecular weight/number average molecular weight (Mw/Mn) of the low-molecular polymer is as small as not more than 3.5 and the proportion of the insoluble infusible high-molecular polymer is as large as from 40 to 90 wt.%. Thus, it is difficult from a practical viewpoint to give a toner satisfactory the fixing properties, offset resistance and grindability unless a fixing machine is provided with an apparatus for feeding an anti-offset liquid. Moreover, the toner must be heat-kneaded at a temperature far higher than that in usual instances or heat-kneaded at a high shear, because the insoluble infusible high-molecular polymer used in a larger amount turns out to have a very high melt viscosity as a result of the heat-kneading carried out when the toner is prepared. In the instance where it is kneaded at a high temperature, the toner characteristics tend to be lowered because of thermal decomposition of other additives. In the instance where it is kneaded at a high shear, the molecules of the binder resin may be excessively cut. Thus, there is the problem that the desired offset resistance can be achieved with difficulty.

Japanese Patent Application Laid-open No. 60-66958 proposes a toner comprising a resin composition obtained by polymerizing monomers in the presence of a low-molecular eight poly(α-methylstyrene) having a number average molecular weight of from 500 to 1,500. In particular, this publication discloses that the number average molecular weight Mn may preferably range from 9,000 to 30,000. With an increase in Mn for the purpose of improving offset resistance, the fixing properties of the toner and the grindability at the time the toner is prepared may become more questionable from a practical viewpoint, so that it is difficult to satisfy a good offset resistance of the toner and the grindability at the time the toner is prepared. Thus, the toner having a poor grindability at the time the toner is prepared brings about a lowering of production efficiency, and also coarse toner particles tend to be mixed into the toner, undesirably resulting in black spots around a toner image.

Japanese Patent Application Laid-open No. 56-16144 (corresponding to U.S. Pat. No. 4,499,168) proposes a toner containing a binder resin component having at least one maximum value in each region of a molecular weight of from $10^3$ to $8 \times 10^4$ and a molecular weight of from $10^5$ to $2 \times 10^6$, in the molecular weight distribution measured by GPC. This toner can give a superiority in the grindability at the time the toner is prepared, offset resistance of the toner, fixing properties, anti-filming or -fusing to a photosensitive member, image quality, etc. The toner, however, is sought to be further improved in the offset resistance and fixing properties.

Japanese Patent Application Laid-open No. 63-223014 (corresponding to European Patent Publication No. 259,819) proposes a binder resin used in a toner, capable of improving the fixing properties of the toner, and also answering the recent severe needs while retaining or improving other various performances. This binder resin contains from 10 to 70% by weight of a THF-insoluble matter, has at least one peak in the region of a molecular weight of from 2,000 to 10,000 and at least one peak or shoulder in the region of a molecular weight of from 15,000 to 100,000, in the molecular eight distribution measured by GPC of a THF-soluble matter, and contains a component with a molecular weight of not more than 10,000, in an amount of from 10 to 50% by weight based on the resin.

However, it is strongly sought to improve the binder resin to improve the development performance of the toner, in particular, the environmental stability, duration stability and so forth so that additional various demands can be met.

Japanese Patent Application Laid-open No. 56-8416 proposes a process for preparing a resin composition comprised of a high-molecular polymer and a low-molecular polymer, comprising the steps of producing a high-molecular polymer by polymerizing monomers without use of any polymerization initiator, dissolving the resulting high-molecular polymer in monomers, and producing a low-molecular polymer by polymerizing monomers in the presence of a polymerization initiator. The toner in which the above resin composition is used does not exhibit preferred environment stability because of the presence of polymerization initiator fragments at many terminals of the low-molecular polymer.

SUMMARY OF THE INVENTION

An object of the present invention is to provide a process for preparing a binder resin used in a toner, having solved the above problems.

Another object of the present invention is to provide a process for preparing a binder resin used in a toner, having a particularly superior environmental stability.

A further object of the present invention is to provide a process for economically preparing a binder resin used in a toner.

A still further object of the present invention is to provide a process for preparing a binder resin used in a toner, capable of producing a binder resin or a toner, that may cause less toner-filming to the surface of a photosensitive member.

A still further object of the present invention is to provide a process for preparing a binder resin used in a toner, capable of preparing a toner having superior fixing properties and at the same time a superior offset resistance, wind-around resistance and blocking resistance.

A still further object of the present invention is to provide a process for preparing a binder resin used in a toner, having a good grindability and a good toner production efficiency.

A still further object of the present invention is to provide a process for preparing a binder resin used in a toner, that may cause less fusion of a toner material to the inside of a grinding machine when the toner material is pulverized.

A still further object of the present invention is to provide a process for preparing a binder resin used in a toner, capable of producing a toner having superior triboelectric characteristics, image quality, durability and so forth.

The above objects of the present invention can be achieved by a process for preparing a binder resin used in a toner, comprising the steps of polymerizing a polymerizable monomer substantially in the absence of a radical polymerization initiator to give a polymer or copolymer having a peak in the region of a molecular weight of from 2,000 to 10,000 in the molecular weight distribution measured by gel permeation chromatography (GPC), a weight average molecular weight/number average molecular weight (Mw/Mn) of $\leq 3.5$, and Tg$\geq 50°$ C., and dissolving the resulting polymer or copolymer in a polymerizable monomer to carry out solution polymerization or suspension polymerization, thereby preparing a resin composition, wherein said resin composition:

contains not more than 70% by weight of a tetrahydrofuran (THF)-insoluble matter;

has an Mw/Mn of $\geq 5$, at least one peak in the region of a molecular weight of from 2,000 to 10,000 and at least one peak or shoulder in the region of a molecular weight of from 15,000 to 100,000, in the molecular weight distribution measured by GPC of a THF-soluble matter; and contains a component with a molecular weight of not more than 10,000 in an amount of from 10 to 50% by weight based on the resin composition.

BRIEF DESCRIPTION OF THE DRAWINGS

In the accompanying drawings;

FIG. 1 shows a chart of GPC of a THF-soluble matter in the resin composition prepared in Example 1;

FIG. 4 is a combination of the charts shown in FIGS. 2 and 3;

FIG. 5 shows a chart for the comparison between FIG. 1 and FIG. 4;

DETAILED DESCRIPTION OF THE PREFERRED EMBODIMENTS

Figure 2:
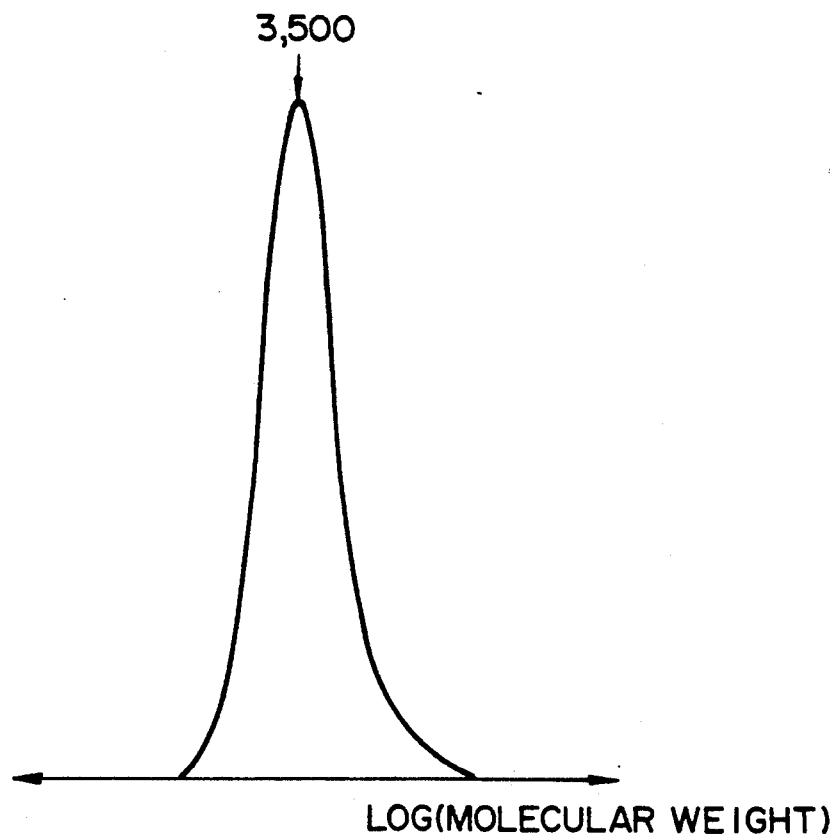
FIG. 2 shows a chart of GPC of polystyrene used in Example 1.

For the purpose of bringing a toner to a more advantageous state in terms of environmental stability, the present inventors made studies on materials that constitute toners. As a result, they have found that binder resins used in toners affect the environmental stability of toners. In particular, they found that the molecular chain terminals of a low-molecular weight component of a polymer and/or copolymer that constitutes a binder resin affect the environmental stability of the toner.

The molecules that constitute a low-molecular weight component have a larger number of molecular chain terminals per unit weight than the molecules that constitute a high-molecular weight component. Hence, use of a radical polymerization initiator at the time the low-molecular weight component is synthesized causes the fragments of the radical polymerization initiator to be bonded to the terminals of the molecules that constitute the low-molecular weight component. The amount thereof becomes larger than that of a high-molecular weight component.

The radical polymerization initiator has a molecular structure necessary for generating radicals. The molecular structure commonly changes to a polar group after the generation of radicals. Hence, the low-molecular weight component having the fragments of the radical polymerization initiator in a large quantity tends to result in a lowering of the environmental stability of a toner mainly composed of a binder resin containing such a low-molecular weight component.

The present inventors have discovered that an economically cost-advantageous binder resin used in toners can be produced when a low-molecular weight polymer or low-molecular weight copolymer is prepared from a monomer substantially in the absence of a radical polymerization initiator, the resulting low-molecular weight polymer or low-molecular weight copolymer is dissolved in a monomer, and then a high-molecular weight polymer or a high-molecular weight copolymer is polymerized from a monomer. They have thus accomplished the present invention.

For example, in the present invention, a low-molecular weight polymer or low-molecular weight copolymer having a peak in the region of a molecular weight of from 2,000 to 10,000 is formed by thermal polymerization.

In the thermal polymerization, the polymerization temperature can be appropriately set. In general, the thermal polymerization gives a polymer or copolymer with a lower molecular weight as the reaction is carried out at a higher temperature and at the same time the viscosity of the reaction system is lowered as the reaction is carried out at a higher temperature. Hence, a uniform temperature distribution can be obtained with ease without accumulation of the heat of polymerization. As a result, according to the thermal polymerization, a polymer or copolymer that satisfies the required properties can be stably, rapidly and cost-advantageously obtained.

It is also possible to decrease the use of expensive radical polymerization initiators, and thus the process of the present invention can more cost-advantageously produce binder resins used in toners.

In the process of the present invention, the polymerization temperature in the first-stage polymerization may preferably be in the range of from 150° to 300° C., and more preferably from 200° to 300° C. The thermal polymerization may also preferably be carried out under conditions of not lower than ordinary pressure, using an apparatus such as an autoclave.

Xylene, toluene, cumene, cellosolve acetate. isopropyl alcohol or benzene may be used as a solvent. In the case of a styrene monomer, xylene, toluene or cumene may preferably be used.

The low-molecular weight component obtained by such a process contains no decomposition products at all, or substantially no decomposition products, ascribable to the radical polymerization initiator.

When, for example, a low-molecular weight polymer is formed by conventional polymerization using benzoyl peroxide, benzoic acid produced from benzoyl peroxide may often have an ill influence on the development performance of a toner. The low-molecular weight polymer obtained in the present invention, however, is free from such an influence.

For example, when a low-molecular weight polymer is formed by conventional polymerization using azobisisobutyronitrile, polymerization initiator fragments may often be attached to the terminals of the low-molecular weight polymer to cause a change in chargeability. The low-molecular weight polymer obtained in the present invention, however, is free from such a possibility.

In the present invention, the polymerization carried out in the absence of a radical polymerization initiator means that the polymerization is carried out substantially by thermal polymerization. In some instances, the thermal polymerization may be carried out using a radical polymerization initiator in an amount of a very small as 0.1% by weight based on the polymerizable monomer.

In the process of the present invention, a first polymer or copolymer (resin) is prepared by the first-stage polymerization which is the polymerization carried out substantially in the absence of a radical polymerization initiator. Then, the first polymer or copolymer is dissolved in a polymerizable monomer, and the polymerizable monomer is subjected to solution polymerization (preferably suspension polymerization) in the presence of a cross-linking agent to carry out second-stage polymerization. The first polymer or copolymer may be dissolved in an amount of from 10 to 120 parts by weight, and preferably from 20 to 100 parts by weight, based on 100 parts by weight of the monomer used in the second stage polymerization. In the second-stage polymerization, a cross-linking agent may preferably be used in an amount of from about 0.1 to about 2.0 by weight based on he monomer in the second-stage polymerization. It is permissible to make some variations on these conditions depending on the types of polymerization initiators and the reaction temperatures.

It is found that the binder resin obtained by dissolving the polymer o copolymer of the first-stage polymerization in a monomer followed by suspension polymerization of the monomer differs from a blend polymer obtained by merely blending i) a polymer obtained by suspension polymerization without dissolving the first polymer and ii) the polymer of the first-stage polymerization.

The difference is that the former has a little broader high-molecular weight distribution than the latter in the chromatogram obtained by GPC of a THF-soluble matter. In the former, a polymer with a molecular weight of not less than 300,000 holds 3 to 25% by weight of the whole resin, which is apparently larger than the latter. It is presumed that the polymer of the first-stage polymerization, having been dissolved at the second-stage polymerization, has an influence on the suspension polymerization, and this brings about the effect beyond the merits of a uniform blend of polymers.

The above will be described in greater detail with reference to GPC charts shown in the accompanying drawings.

Figure 3:
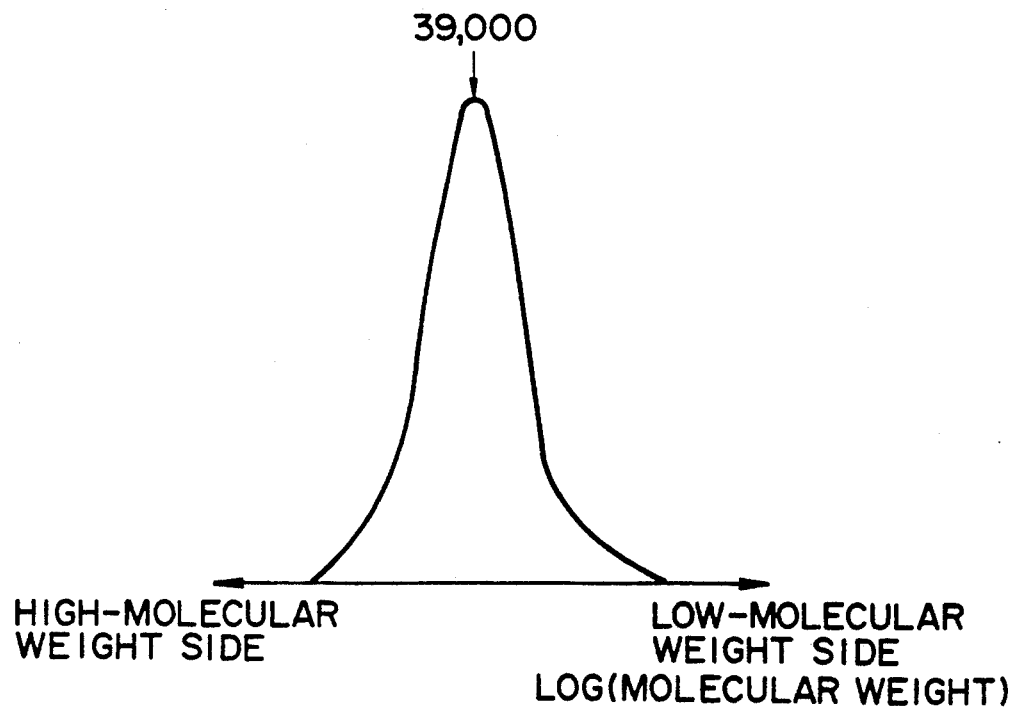
FIG. 3 shows a chart of GPC of a THF-soluble matter in the product obtained by suspension polymerization of a styrene/n-butyl acrylate copolymer alone, used in Example 1.
Figure 6:
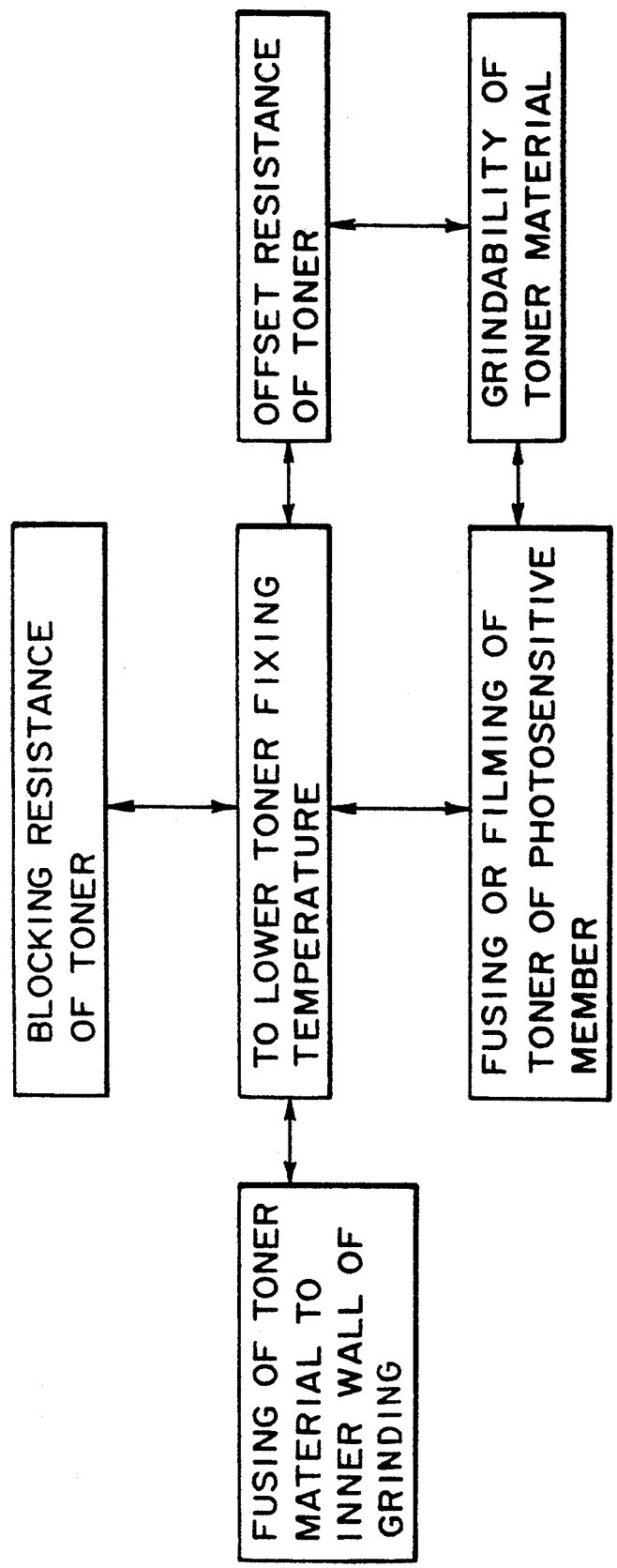
FIG. 6 is a diagram to show the correlation between the characteristics required for a toner.

In the accompanying drawings, FIG. 1 shows a chart of GPC of a THF-soluble matter in the resin composition obtained in Example 1 as will be described later. FIG. 2 shows a chart of GPC of polystyrene prepared by solution polymerization corresponding to the first-stage polymerization. The polystyrene is soluble in THF, and also soluble in a styrene monomer and a n-butyl acrylate monomer which are polymerizable monomers used in the second-stage polymerization. It has a main peak at a molecular weight of 3,500. FIG. 3 shows a chart of GPC of a THF-soluble matter in the product obtained by suspension polymerization of a styrene/n-butyl acrylate copolymer prepared in the second-stage polymerization under the same conditions except for no addition of the polystyrene. The styrene/n-butyl acrylate copolymer has a main peak at a molecular weight of 39,000.

FIG. 4 is a combination of the chart of FIG. 2 and the chart of FIG. 3.

FIG. 5 is a chart showing a combination of the chart of FIG. 1 and the chart of FIG. 4 (the solid line is replaced by a dotted line). As will be apparent from FIG. 5, the resin composition obtained in Example 1 according to the present invention gives a GPC chart different from that of a mere blend of the polystyrene separately prepared and the styrene/n-butyl acrylate copolymer. In particular, a high-molecular component that has not been formed when the styrene/n-butyl acrylate copolymer is used alone is seen to have been formed on the high-molecular weight side. As to this high-molecular weight component, it is presumed that, since the polystyrene prepared in the first-stage polymerization is present at the time of the suspension polymerization corresponding to the second-stage polymerization, the polystyrene has acted as a polymerization regulator and consequently the synthesis of the THF-insoluble matter and THF-soluble matter in the styrene/n-butyl acrylate copolymer has been regulated. The resin composition according to the present invention comprises a uniform blend of a THF-insoluble matter, a THF-soluble high-molecular weight component, a THF-soluble intermediate-molecular weight component and a THF-soluble low-molecular weight component. Moreover, the resin composition prepared according to the process of the present invention forms a new peak in the region of a molecular weight of not less than 300,000, and preferably not less than 500,000, because molecular chains are cut as a result of melt kneading at the time a toner is prepared, thus having an ability of regulating the fixing properties and offset resistance of the toner.

In the present invention, a component with a molecular weight of not less than 300,000 according to the GPC of a THF-soluble matter of a toner may preferably be contained in an amount of from 5 to 30% by weight, and preferably from 10 to 30% by weight, based on the binder resin. A product having a clear peak in the region of a molecular weight of not less than 300,000, and preferably not less than 500,000, according to the GPC of a THF-soluble matter of a toner is more preferred from the viewpoint of the improvement in offset resistance and wind-around resistance.

The suspension polymerization according to the present invention will be described below.

The suspension polymerization may be carried out using a monomer in an amount of not more than 100 parts by weight, and preferably from 10 to 90 parts by weight, based on 100 parts by weight of an aqueous solvent. A dispersant usable in the present invention includes polyvinyl alcohol, partially saponified polyvinyl alcohol, and calcium phosphate. The dispersant may usually be used in an amount of from 0.05 to 1 part by weight based on 100 parts by weight of an aqueous solvent. It is suited for the polymerization to be carried out at a temperature of from 50° to 95° C. The temperature may be appropriately selected depending on the types of polymerization initiators used and resin compositions to be obtained. Any polymerization initiators can be used so long as they are insoluble or sparingly soluble in water. For example, benzoyl peroxide, tert-butyl peroxyhexanoate or the like may preferably be used in an amount of from 0.5 to 10 parts by weight based on 100 parts by weight of monomers.

In the case when the second-stage polymerization is carried out by solution polymerization, a solvent used in the solution polymerization includes xylene, toluene, cumene, cellosolve acetate, isopropyl alcohol, and benzene. In the case of a styrene monomer, xylene, toluene or cumene is preferred. A polymerization initiator may preferably include di-tert-butyl peroxide, tert-butyl peroxybenzoate, benzoyl peroxide, 2,2'-azobisisobutyronitrile, 2,2'-azobis(2,4-dimethylvaleronitrile). The polymerization initiator may be used in a concentration of not less than 0.1 part by weight, and preferably from 0.4 to 15 parts by weight, based on 100 parts by weight of monomers. The reaction should be carried out at a temperature of usually from 70° C. to 180° C., though variable depending on the types of organic solvents used, polymerization initiators and polymers to be formed. The solution polymerization may preferably be carried out using monomers in an amount of from 30 parts by weight to 400 parts by weight based on 100 parts by weight of the organic solvent.

In the present invention, as the monomers for producing the binder resin used in a toner, various monomers can be used so long as they can give the molecular weight distribution described above. In particular, it is preferred to use a vinyl polymer or vinyl copolymer obtained by utilizing vinyl monomers, a composition of the polymer and copolymer of such types, and a composition of copolymers of such types.

The vinyl monomers used in the present invention includes styrene; substitution products of styrene such as α-methylstyrene, and p-chlorostyrene; monocarboxylic acids having a double bond, and substitution products thereof, such as acrylic acid, methyl acrylate, ethyl acrylate, butyl acrylate, dodecyl acrylate, octyl acrylate, methacrylic acid, methyl methacrylate, ethyl methacrylate, butyl methacrylate, octyl methacrylate, acrylonitrile, methacrylonitrile, and acrylamide: dicarboxylic acids having a double bond, and substitution products thereof, such as maleic acid, butyl maleate, methyl maleate, and dimethyl maleate; vinyl esters such as vinyl chloride, vinyl acetate, and vinyl benzoate; vinyl ketones such as methyl vinyl ketone, and ethyl vinyl ketone; and vinyl ethers such as methyl vinyl ether, ethyl vinyl ether, and isopropyl vinyl ether. These vinyl monomers may be used alone or in combination of two or more kinds. Of these, preferred is a combination of a styrene polymer with a styrene copolymer, or a combination of styrene copolymers.

As a cross-linking monomer, a compound having two or more of copolymerizable double bonds is used. For example, it includes aromatic divinyl compounds such as divinylbenzene, and divinylnaphthalene; carboxylic acid esters having two double bonds, such as ethylene glycol diacrylate, ethylene glycol dimethacrylate, and 1,3-butanediol dimethacrylate; divinyl compounds such as divinylaniline, divinyl ether, divinyl sulfide, and divinyl sulfone; and compounds having three or more vinyl groups. These cross-linking monomers may be used alone or in the form of a mixture. In particular, divinylbenzene is effective.

The resin or resin composition prepared in the present invention can have a glass transition point which is different depending on the types or composition of monomers. The resin or resin composition may effectively have a glass transition point ranging from 40° to 80° C. It may more preferably have a glass transition point of from 50° to 65° C. This is preferred from the viewpoint of blocking resistance and fixing properties. A glass transition point lower than 40° C. greatly tends to cause thermal agglomeration or caking during the storage of a toner and hence tends to cause troubles due to the agglomeration of a toner in a copying machine. A glass transition point higher than 80° C. tends to lower the heat fixing efficiency of a toner.

Figure 7:
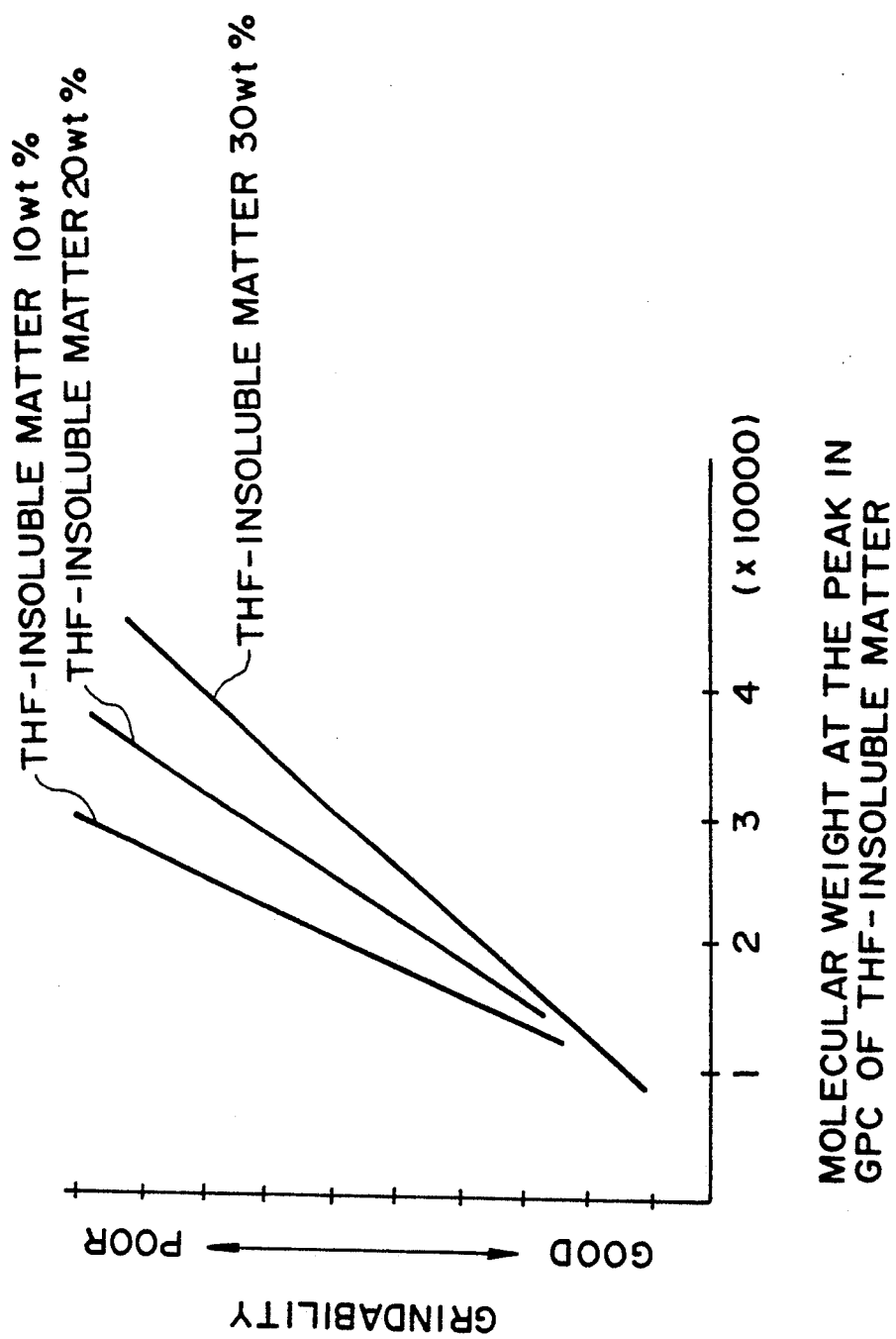
FIG. 7 is a graph to show the relation between content of a THF-insoluble matter and grindability.

The binder resin thus produced can be dissolved with an organic solvent such as THF, so that it is separated into a THF-insoluble matter and a THF-soluble matter. In respect of the THF-soluble matter, The molecular weight distribution can be measured by GPC. FIG. 7 shows the relationship between the position of a peak in the molecular weight distribution of the THF-soluble matter and the grindability of a toner material. In instances in which the THF-insoluble matter is not present or present only in a little quantity, the grindability of a toner material during preparation of a toner tends to be lowered. The tendency in which the position of a peak in the molecular weight distribution of the THF-soluble matter is merely shifted to the position of the low-molecular weight side in order to improve the grindability of a toner material as previously mentioned, brings about a lowering of offset resistance of a toner. Thus, the data support the fact that it is difficult to satisfy both the offset resistance of a toner and the grindability of a toner material.

It is effective for the binder resin to contain the THF-insoluble matter in a given amount for the purpose of not only improving the offset resistance of a toner but also improving the grindability of a toner material.

Figure 8:
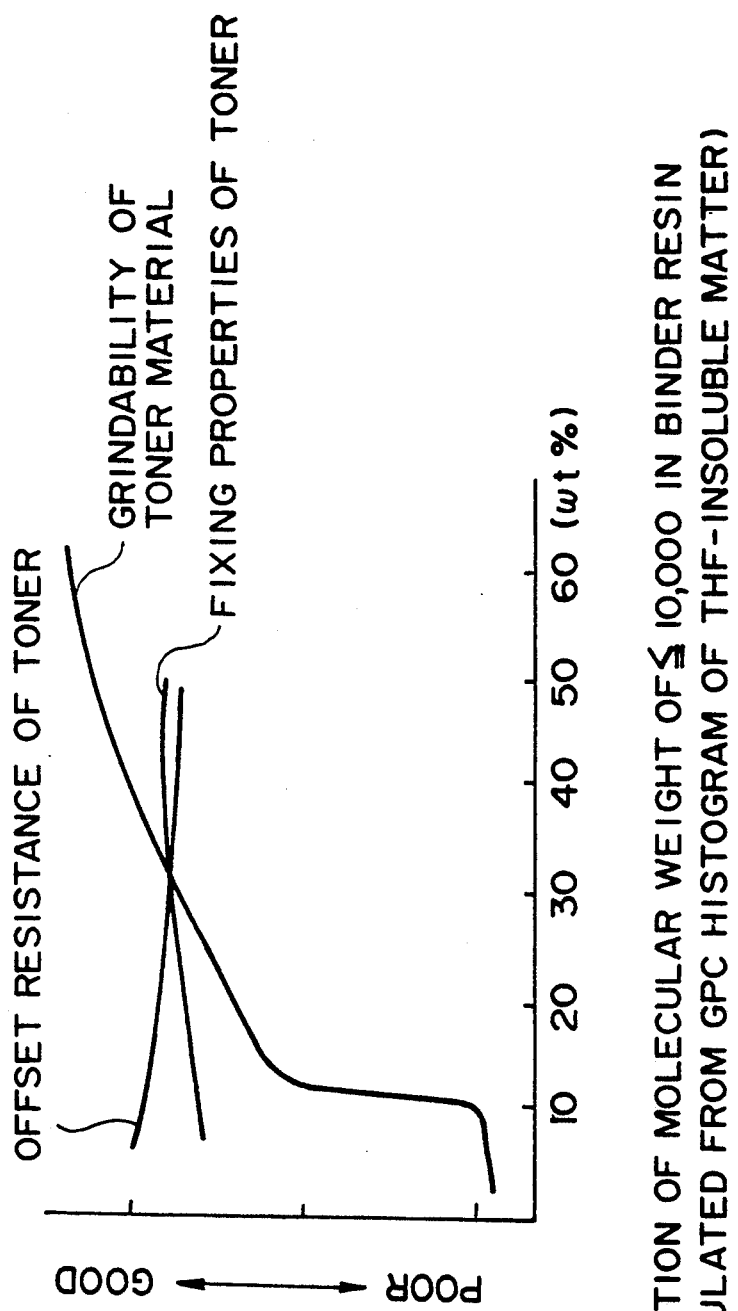
FIG. 8 is a graph to show the correlation between content of the component with a molecular weight of not more than 10,000 and toner characteristics.

As shown in FIG. 8, a component with a molecular weight of not more than about 10,000 in the molecular weight distribution of the THF-soluble matter acts differently from a component with that of more than about 10,000 between the properties of whether or not a toner is capable of being fixed at a high temperature or a low temperature (hereinafter simply "fixing properties"), the offset resistance of a toner, the grindability of a toner material and the blocking resistance of a toner. The proportion of the component having a molecular weight of not more than 10,000 to the whole binder resin does not strongly influence the fixing properties or offset resistance of a toner, as contrary to what is usually said, but is strongly concerned with the grindability of a toner material at the time a toner is prepared. In addition, the THF-insoluble matter mainly affects the offset resistance of a toner, the transfer sheet wind-around resistance to a fixing roller, and the grindability of a toner material. The component with a molecular weight of not more than 10,000 in the molecular weight distribution of the THF-soluble matter mainly affects the grindability of a toner material, the blocking resistance of a toner, the fusing and filming of a toner to a photosensitive member, and the fusing of a toner material to the inner wall of a grinding machine. A component with a molecular weight of more than 10,000 in the molecular weight distribution of the THF-soluble matter also mainly influence the fixing properties of a toner.

The component with a molecular weight of not more than 10,000 may be in an amount of from 10 to 50% by weight, and preferably from 20 to 39% by weight. In order to achieve satisfactory performance, the THF-soluble matter may preferably have a peak in the region of a molecular weight of from 2,000 to 10,000, and more preferably from 2,000 to 8,000, and also have a peak or shoulder in the region of a molecular weight of from 15,000 to 100,000, and more preferably from 20,000 to 70,000. If it has no peak at a molecular weight of from 2,000 to 10,000 and has a peak at a molecular weight of less than 2,000, or the component with a molecular weight of not more than 10,000 is contained in an amount of more than 50% by weight, problems may arise a little in respect of the blocking resistance of a toner of a toner, the fusing and filming of a toner to a photosensitive member, and the fusing of a toner material to the inner wall of a grinding machine. If it has no peak at a molecular weight of not more than 10,000 and has a peak at a molecular weight of more than 10,000, or the component with a molecular weight of not more than 10,000 is contained in an amount of less than 10% by weight, the grindability of a toner material, in particular, tends to be lowered, and coarse particles may also be produced to give a problem.

When it has no peak or shoulder in the region of a molecular weight of more than 15,000 and has a peak only in the region of a molecular weight of less than 15,000, the offset resistance of a toner, the anti-fusing of a toner to a photosensitive member and the anti-filming thereof to a photosensitive member tend to be lowered and also the fusing of a toner material to the inner wall of a grinding machine tends to increase. If it has no peak or shoulder in the region of a molecular weight of from 15,000 to 100,000 and has a main peak at a molecular weight of more than 100,000, the grindability of a toner material tends to be lowered.

The THF-soluble matter needs to be $Mw/Mn \geq 5$. An $Mw/Mn$ of less than 5 tends to result in lowering of offset resistance to give a problem. It may preferably have an $Mw/Mn$ of from 5 to 80, and more preferably $10 \leq Mw/Mn \leq 60$. In particular, the $Mw/Mn$ of $10 \leq Mw/Mn \leq 60$ can bring about particularly superior performance in respect of various characteristics such as the grindability of a toner material, the fixing properties of a toner, the offset resistance of a toner, and the image quality.

The THF-insoluble matter in the resin composition may preferably be contained in an amount of from 10 to 70% by weight, and more preferably from 10 to 60% by weight. An amount less than 10% by weight, of the THF-insoluble matter tends to result in lowering of the offset resistance of a toner and the transfer sheet wind-around resistance to a fixing roller. An amount more than 70% by weight may cause a problem of the deterioration due to the cut of molecular chains as a result of heat kneading at the time a toner is prepared. The THF-insoluble matter may preferably be contained in an amount of from 15 to 59% by weight, and more preferably from 15 to 49% by weight.

As previously described, the proportion $W_1$ of the component with molecular weight of not more than 10,000 to the whole binder resin does not strongly influence the fixing properties or offset resistance of a toner, but is strongly concerned with the grindability of a toner material at the time a toner is prepared. In addition, in the binder resin, the proportion $W_2$ of a component with a molecular weight of not less than 500,000 affects the offset resistance of a toner, the transfer sheet wind-around resistance at the time of fixing, and the folding resistance of a toner image.

In order to exhibit good properties, the binder resin may preferably have a ratio of $W_2/W_1$ in the range of from 0.05 to 2.0. A ratio less than 0.05 may cause problems in the offset resistance of a toner nd the folding resistance of a toner image. A ratio more than 2.0 may cause a problem of the rise in the fixing temperature and the deterioration due to the cut of molecular chains as a result of heat kneading at the time a toner is prepared. The ratio of $W_2/W_1$ may more preferably be in the range of from 0.1 to 2.0.

When the glass transition point $Tg_1$ of the component with a molecular weight of not more than 10,000 in the molecular weight distribution of the THF-soluble matter is compared with the glass transition point $Tg_t$ of the whole resin composition, it has been discovered that a relation of $Tg_1 \geq Tg_t - 5$ can bring about an improvement in the fixing properties of a toner, the grindability of a toner material, the anti-fusing and filming of a toner to a photosensitive member, the anti-fusing of a toner material to the inner wall of a grinding machine, and the blocking resistance of a toner.

The above $Tg_1$ is a value measured by the following method: At a temperature of 25° C., THF is flowed at a flow rate of 7 ml per minute. About 3 ml of a THF sample solution of about 3 mg/ml in concentration of the THF-soluble matter in the resin composition is injected into an apparatus for measuring molecular weight distribution, and the component with a molecular weight of not more than 10,000 is fractionated. After it has been fractionated, the solvent is evaporated under reduced pressure, followed by drying for 24 hours under reduced pressure in an atmosphere of 90° C. The above procedure is repeated until the component with a molecular weight of not more than 10,000 is obtained in an amount of about 20 mg, and then annealing is carried out at 50° C. for 48 hours. Thereafter, the glass transition point is measured by differential scanning colorimetry. The resulting value is expressed as $Tg_1$.

As columns for fractionation, TSKgel G2000H, TSKgel G2500H, TSKgel G3000H, TSKgel G4000H (all available from Toyo Soda Manufacturing Co., Ltd.), etc. may be used.

In the present invention, it is preferred to use TSKgel G2000H and TSKgel G3000H in combination.

As to the $Tg_t$, the glass transition point of the resin, a resin is annealed at 50° C. for 48 hours, and thereafter the value is determined by differential scanning colorimetry.

In a most preferred embodiment of the binder resin prepared by the process of the present invention, the binder resin comprises a resin or resin composition having a ratio of $h_1/h_2$, of from 0.4 to 4.0/1, where $h_2$ is the height of a highest peak in the region of a molecular weight of from 15,000 to 100,000 and $h_1$ is the height of a highest peak in the region of a molecular weight of from 2,000 to 10,000, in the molecular weight distribution measured by GPC of the THF-soluble matter. In addition, the THF-soluble matter may preferably have a number average molecular weight of $2,000 \leq Mn \leq 9,000$. A value of $Mn < 2,000$ tends to result in lowering of the offset resistance of a toner, and a value of $Mn > 9,000$ tends to result in lowering of the grindability of a toner material and the fixing properties of a toner.

The THF-insoluble matter referred to in the present invention indicates the weight proportion of a polymer component having come insoluble to THF in the resin composition i.e., substantially a cross-linked polymer), and can be used as a parameter that indicates the degree of cross-linking of the resin composition containing a cross-linked component. The THF insoluble matter is defined by a value measured in the following manner.

A sample (a 24 mesh-pass and 60 mesh-on powder) of the resin or resin composition is weighed in an amount of from 0.5 to 1.0 g ($W_1$ g), which is then put in a cylindrical filter paper (for example, No. 86R, available from Toyo Roshi K.K.) and set on a Soxhlet extractor. Extraction is carried out for 6 hours using from 100 to 200 ml of THF as a solvent, and the soluble component extracted by the use of the solvent is evaporated, followed by vacuum drying at 100° C. for several hours. Then the THF-soluble resin component is weighed ($W_2$ g) The THF-insoluble matter of the resin or resin composition is determined from the following expression.

THF-insoluble matter $(\%) = (W_1 - W_2)/W_1 \times 100$

In the present invention, the molecular weight at the peak and/or shoulder on the chromatogram obtained by GPC (gel permeation chromatography) is measured under the following conditions.

Columns are stabilized in a heat chamber heated to 40° C. To the columns kept at this temperature, THF (tetrahydrofuran) as a solvent is flowed at a flow rate of 1 ml per minute, and from 50 to 200 $\mu$l of a THF sample solution of a resin prepared to have a sample concentration of from 0.05 to 0.6% by weight is injected thereinto to make measurement. In measuring the molecular weight of the sample, the molecular weight distribution ascribed to the sample is calculated from the relationship between the logarithmic value and count number of a calibration curve prepared using several kinds of monodisperse polystyrene standard samples. As the standard polystyrene samples used for the preparation of the calibration curve, it is preferred to use, for example, samples with molecular weights of $6 \times 10^2$, $2.1 \times 10^3$, $4 \times 10^3$, $1.75 \times 10^4$, $5.1 \times 10^4$, $1.1 \times 10^5$, $3.9 \times 10^5$, $8.6 \times 10^5$, $2 \times 10^6$ and $4.48 \times 10^6$, which are available from Pressure Chemical Co. or Toyo Soda Manufacturing Co., Ltd. It is suitable to use at least about 10 standard polystyrene samples. An RI (refractive index) detector is used as a detector.

Columns may preferably be used in combination of a plurality of commercially available polystyrene gel columns so that the regions of molecular weights of from $10^3$ to $2 \times 10^6$ can be accurately measured. For example, they may preferably comprise a combination of $\mu$-Styragel 500, $10^3$, $10^4$ and $10^5$, available from Waters Co.; Shodex KF-80M or a combination of KF-801, 803, 804 and 805 or a combination of KA-802, 803, 804 and 805, available from Showa Denko K.K.; or a combination of TSKgel G1000H, G2000H, G2500H, G3000H, G4000H, G5000H, G6000H, G7000H and GMH, available from Toyo Soda Manufacturing Co., Ltd.

In regard to the % by weight with respect to the binder resin of the present invention, having a molecular weight of not more than 10,000, a chromatogram obtained by GPG is cut out at the part corresponding to the molecular weight of not more than 10,000, and the weight ratio thereof to a cutting corresponding to a molecular weight of more than 10,000 is calculated. Using the % by weight of the above THF-insoluble matter, the % by weight with respect to the whole binder resin is calculated.

The toner in which the binder resin prepared in the present invention is employed may contain in addition to the above binder resin components the following materials in an amount less than the content of the binder resin components.

For example, they include silicone resins, polyesters, polyurethanes, polyamides, epoxy resins, polyvinyl butyral, rosins, modified rosins, terpene resins, phenol resins, aliphatic or alicyclic hydrocarbon resins such as low-molecular weight polyethylenes or low-molecular weight polypropylenes, aromatic petroleum resins, chlorinated paraffin, and paraffin wax.

When a magnetic toner is prepared using the binder resin prepared in the present invention, magnetic fine particles are incorporated into the toner. Any materials may be used as the magnetic fine particles so long as they exhibit magnetic properties or can be magnetized. For example, they include metals such as iron, manganese, nickel, cobalt, and chromium; magnetite, hematite, ferrite of various types, manganese alloys, and other ferromagnetic alloys. These can be used in the form of a fine powder with an average particle diameter of about 0.05 to $5\mu$, and more preferably from 0.1 to $1\mu$. The magnetic fine particles may be contained in the magnetic toner in an amount of from 15 to 70% by weight based on the total weight of the toner.

Various materials can be added to the toner containing the binder resin prepared by the process of the present invention, for the purpose of coloring and/or charge controlling. For example, they include carbon black, black iron oxide, graphite, Nigrosine, metal complexes of monoazo dyes, ultramarine blue, Phthalocyanine Blue, Hansa yellow, Benzidine Yellow, quinacridone, and all sorts of lake pigments.

The toner made from the binder resin prepared in the present invention and the materials such as magnetic fine particles, colorants and charge-controlling agents has a strong resistance to the load applied in developing equipment, is not crushed or deteriorated in a durability test, and causes less contamination of sleeves.

When the toner is prepared, an ethylenic olefin polymer may be used as a fixing aid together with the binder resin.

Here, the polymer used as an ethylenic olefin homopolymer or ethylenic olefin copolymer includes polyethylene, polypropylene, an ethylene/propylene copolymer, an ethylene/vinyl acetate copolymer, an ethylene/ethyl acrylate copolymer, and ionomers having a polyethylene skeleton. The above copolymer may preferably contain olefin monomer in an amount of not less than 50 mol %, and more preferably not less than 60 mol %.

Electrophotography in which the toner containing the resin binder prepared in the present invention is applied will be described below.

A process in which an electrostatic latent image is developed by the use of a toner includes the magnetic brush development, the cascade development, the powder cloud development, the method disclosed in U.S. Pat. No. 3,909,258 in which a conductive magnetic toner is used, which are as previously referred to, and a method in which a magnetic toner with a high resistivity is used, as disclosed in Japanese Patent Application Laid-open No. 53-31136. The toner in which the binder resin according to the present invention is used is also suitable for a development process in which the so-called one-component developer, incorporated with magnetic fine particles, is used. In the step of transferring a developed image to a transfer medium, electrostatic transfer methods such as the corona transfer method and the bias transfer method is used.

In the toner in which the binder resin prepared by the process of the present invention is used, the blade cleaning method, the fur brush cleaning method, or the like may be applied in the step of removing the toner remaining on a photosensitive layer or an insulating layer. In particular, the toner is suited for the blade cleaning method.

A toner image on the transfer medium must be fixed on the medium. As a method therefor, the heat fixing method, the solvent fixing method, the blash fixing method, the laminate fixing method, etc. can be used. The binder resin according to the present invention is particularly suited for the heat-roller fixing method.

EXAMPLES

The present invention will be specifically described below by giving Examples. The present invention, however, is by no means limited by these.

EXAMPLE 1

In an autoclave equipped with a stirrer, 50 parts by weight of cumene and 100 parts by weight of styrene monomer were introduced, and heated at a temperature of 280° C. for 3 hours to carry out thermal polymerization. After the thermal polymerization was completed, the cumene was removed under reflux. The resulting polystyrene was capable of dissolving in THF, had an Mw of 3,600, had an Mw/Mn of 2.5, had a main peak at a molecular weight of 3,500 as measured by GPC, and had a Tg of 58° C.

The above polystyrene in an amount of 30 parts by weight was dissolved in the following monomer mixture to give a mixed solution.

| Monomer mixture | Mixing proportion (parts by weight) |
|---|---|
| Styrene monomer | 54 |
| n-Butyl acrylate monomer | 16 |
| Divinylbenzene | 0.3 |
| Benzoyl peroxide | 1.4 |

In the above mixed solution, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of polystyrene and a styrene/n-butyl acrylate copolymer. In the resin composition, a THF-insoluble matter and a THF-soluble matter were in a uniformly mixed state and the polystyrene and the styrene/n-butyl acrylate copolymer were also in a uniformly mixed state. The THF-insoluble matter in the resulting resin composition (a resin composition powder of 24 mesh-pass and 60 mesh-on was used) was in an amount of 25% by weight. The molecular weight distribution of the THF-soluble matter was measured to reveal that it had peaks at molecular weights of 4,000 and 34,000, respectively, had an Mn of 5,500, had an Mw of 130,000, and had an Mw/Mn of 24. The component with a molecular weight of not more than 10,000 was in an amount of 25% by weight. It was also confirmed that the Tg of the resin composition was 59° C. and the glass transition point $Tg_1$ of the component with a molecular weight of not more than 10,000, fractionated by GPC, was 58° C.

A GPC chromatogram of the THF-soluble matter is shown in FIG. 1. In the GPC chromatogram, $h_1/h_2$ was about 0 7/1.

The characteristics concerned with the molecular weight of the resins and resin composition were measured by the following method.

Using Shodex KF-80M as GPC columns, which were set in a 40° C. heat chamber of a GPC apparatus (150C ALC/GPC, manufactured by Waters Co.), GPC was carried out by injecting 200 μl of a sample (concentration of THF-soluble matter: about 0.1% by weight) under conditions of a THF flow rate of 1 ml/min, using an RI detector as a detector. To prepare the calibration curve for the measurement of molecular weight, a THF solution of a monodisperse polystyrene standard substances (available from Waters Co.) comprised of 10 samples with molecular weights of $0.5 \times 10^3$, $2.35 \times 10^3$, $10.2 \times 10^3$, $35 \times 10^3$, $110 \times 10^3$, $200 \times 10^3$, $470 \times 10^3$, $1,200 \times 10^3$, $2,700 \times 10^3$ and $8,420 \times 10^3$.

EXAMPLE 2

In an autoclave equipped with a stirrer, 50 parts by weight of cumene, 95 parts by weight of styrene monomer and 5 parts by weight of α-methylstyrene monomer were introduced, and heated at a temperature of 260° C. for 3 hours to carry out thermal polymerization. After the thermal polymerization was completed, the cumene was removed under reflux. The resulting styrene/α-methylstyrene copolymer had an Mw of 4,500, had an Mw/Mn of 2.7, had a main peak at a molecular weight of 4,400 in the chart of GPC, and had a Tg of 64° C.

The above styrene/α-methylstyrene copolymer in an amount of 30 parts by weight was dissolved in the following monomer mixture to give e mixed solution.

| Monomer mixture | Mixing proportion (parts by weight) |
|---|---|
| Styrene monomer | 55 |
| 2-Ethylhexyl acrylate | 15 |
| Divinylbenzene | 0.31 |
| Benzoyl peroxide | 1.4 |

In the above mixed solution, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of a styrene/α-methylstyrene copolymer and a styrene/2-ethyhexyl acrylate copolymer.

The THF-insoluble matter in the resulting resin composition was in an amount of 32% by weight. The molecular weight distribution of the THF-soluble matter was measured to reveal that it had peaks at molecular weights of 5,000 and 42,000, respectively, had an Mn of 6,200, had an Mw of 130,000, and had an Mw/Mn of 21. The component with a molecular weight of not more than 10,000 was in an amount of 20% by weight. It was also confirmed that the Tg of the resin composition was 58° C. and the glass transition point $Tg_1$ of the component with a molecular weight of not more than 10,000, fractionated by GPC, was 60° C.

EXAMPLE 3

In an autoclave equipped with a stirrer, 50 parts by weight of cumene, 90 parts by weight of styrene monomer and 10 parts by weight of methyl methacrylate monomer were introduced, and heated at a temperature of 270° C. for 3 hours to carry out thermal polymerization. After the thermal polymerization was completed, the cumene was removed under reflux. The resulting styrene/methyl methacrylate copolymer had an Mw of 3,700, had an Mw/Mn of 2.7, had a main peak at a molecular weight of 3,900, and had a Tg of 61° C.

The above styrene/methyl methacrylate copolymer in an amount of 40 parts by weight was dissolved in the following monomer mixture to give a mixed solution.

| Monomer mixture | Mixing proportion (parts by weight) |
|---|---|
| Styrene monomer | 38 |
| n-Butyl methacrylate monomer | 22 |
| Divinylbenzene | 0.24 |
| Benzoyl peroxide | 0.66 |
| tert-Butylperoxy-2-ethylhexanoate | 0.85 |

In the above mixed solution, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of a styrene/methyl methacrylate copolymer and a styrene/n-butyl methacrylate copolymer.

The THF-insoluble matter in the resulting resin composition was in an mount of 35% by weight. The molecular weight distribution of the THF-soluble matter was measured to reveal that it had peaks at molecular weights of 4,000 and 43,000, respectively, had an Mn of 5,900, had an Mw of 92,000, and had an Mw/Mn of 16. The component with a molecular weight of not more than 10,000 was in an amount of 32% by weight. It was also confirmed that the Tg of the resin composition was 60° C. and the glass transition point $Tg_1$ of the component with a molecular weight of not more than 10,000, fractionated by GPC, was 58° C.

EXAMPLE 4

In an autoclave equipped with a stirrer, 50 parts by weight of cumene and 100 parts by weight of styrene monomer were introduced, and heated at a temperature of 280° C. for 3 hours to carry out thermal polymerization. After the thermal polymerization was completed, the cumene was removed under reflux. The resulting polystyrene was capable of dissolving in THF, had an Mw of 3,700, had an Mw/Mn of 2.5, had a main peak at a molecular weight of 3,500 as measured by GPC, and had a Tg of 58° C.

The above polystyrene in an amount of 30 parts by weight was dissolved in the following monomer mixture to give a mixed solution.

| Monomer mixture | Mixing proportion (parts by weight) |
| --- | --- |
| Styrene monomer | 55 |
| n-Butyl-acrylate monomer | 15 |
| Divinylbenzene | 0.15 |
| tert-Butylperoxy-2-ethylhexanoate | 1.6 |

In the above mixture, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of polystyrene and a styrene/n-butyl acrylate copolymer.

The THF-insoluble matter in the resulting resin composition was in an amount of 44% by weight. The molecular weight distribution of the THF-soluble matter was measured to reveal that it had peaks at molecular weights of 4,000 and 70,000, respectively, had an Mn of 5,800, had an Mw of 100,000, and had an Mw/Mn of 17. The component with a molecular weight of not more than 10,000 was in an amount of 21% by weight. It was also confirmed that the Tg of the resin composition was 56° C. and the glass transition point $Tg_1$ of the component with a molecular weight of not more than 10,000, fractionated by GPC, was 56° C.

EXAMPLE 5

In an autoclave equipped with a stirrer, 50 parts by weight of cumene and 100 parts by weight of styrene monomer were introduced, and heated at a temperature of 225° C. for 4 hours to carry our thermal polymerization. After the thermal polymerization was completed, the cumene was removed under reflux. The resulting polystyrene had an Mw of 6,900, had an Mw/Mn of 2.2, had a main peak at a molecular weight of 7,100, and had a Tg of 76° C.

The above polystyrene in an amount of 30 parts by weight was dissolved in the following monomer mixture to give a mixed solution.

| Monomer mixture | Mixing proportion (parts by weight) |
| --- | --- |
| Styrene monomer | 52 |
| n-Butyl acrylate monomer | 18 |
| Divinylbenzene | 0.3 |
| Benzoyl peroxide | 1 |
| tert-Butylperoxy-2-ethylhexanoate | 0.8 |

In the above mixture, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of polystyrene and a styrene/n-butyl acrylate copolymer.

The THF-insoluble matter in the resulting resin composition was in an amount of 30% by weight. The molecular eight distribution of the THF-soluble matter was measured to reveal that it had peaks at molecular weights of 7,500 and 43,000, respectively, had an Mn of 6,500, had an Mw of 100,000, and had an Mw/Mn of 15. The component with a molecular weight of not more than 10,000 was in an amount of 18% by weight. It was also confirmed that the Tg of the resin composition was 61° C. and the glass transition point $Tg_1$ of the component with a molecular weight of not more than 10,000, fractionated by GPC, was 70° C.

COMPARATIVE EXAMPLE 1

In a reaction vessel, 150 parts by weight of cumene was introduced, and temperature was raised to 85° to 90° C. A mixture of 100 parts by weight of styrene monomer and 8 parts by weight of a radical polymerization initiator, benzoyl peroxide, was dropwise added over a period of 4 hours. Polymerization was further carried out at temperatures of from 85° to 90° C. After the polymerization was completed, the cumene was removed under reflux. The resulting polystyrene was capable of dissolving in THF, had an Mw of 3,600, had an Mw/Mn of 2.6, had a main peak at a molecular weight of 3,400 as measured by GPC, and had a Tg of 55° C.

The above polystyrene in an amount of 30 parts by weight was dissolved in the following monomer mixture to give a mixed solution.

| Monomer mixture | Mixing proportion (parts by weight) |
| --- | --- |
| Styrene monomer | 54 |
| n-Butyl acrylate monomer | 16 |
| Divinylbenzene | 0.31 |
| Benzoyl peroxide | 1.4 |

In the above mixed solution, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of polystyrene and a styrene/n-butyl acrylate copolymer. In the resin composition, a THF-insoluble matter and a THF-soluble matter were in a uniformly mixed state and the polystyrene and the styrene/n-butyl acrylate copolymer were also in a uniformly mixed state. The THF-insoluble matter in the resulting resin composition (a resin composition powder of 24 mesh-pass and 60 mesh-on was used) was in an amount of 25% by weight. The molecular weight distribution of the THF-soluble matter was measured to reveal that it had peaks at molecular weights of 4,000 and 34,000, respectively, had an Mn of 5,500, had an Mw of 130,000, and had an Mw/Mn of 24. The component with a molecular weight of not more than 10,000 was in an mount of 25% by weight. It was also confirmed that the Tg of the resin composition was 57° C. and the glass transition point $Tg_1$ of the component with a molecular weight of not more than 10,000, fractionated by GPC, was 56° C.

COMPARATIVE EXAMPLE 2

In a reaction vessel, 150 parts by weight of cumene was introduced, and temperature was raised to 75° to 80° C. A mixture of 100 parts by weight of styrene monomer and 8 parts by weight of a radical polymerization initiator azobisisobutyronitrile was dropwise added over a period of 4 hours. Polymerization was further carried out at temperatures of from 75° to 80° C. After the polymerization was completed, the cumene was removed under reflux. The resulting polystyrene was capable of dissolving in THF, had an Mw of 3,700, had an Mw/Mn of 2.5, had a main peak at a molecular weight of 3,500 as measured by GPC, and had a Tg of 58° C.

The above polystyrene in an amount of 30 parts by weight was dissolved in the following monomer mixture to give a mixed solution.

| Monomer mixture | Mixing proportion (parts by weight) |
| --- | --- |
| Styrene monomer | 54 |
| n-Butyl acrylate monomer | 16 |
| Divinylbenzene | 0.32 |
| Benzoyl peroxide | 1.4 |

In the above mixed solution, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of polystyrene and a styrene/n-butyl acrylate copolymer. In the resin composition, a THF-insoluble matter and a THF-soluble matter were in a uniformly mixed state and the polystyrene and the styrene/n-butyl acrylate copolymer were also in a uniformly mixed state. The THF-insoluble matter in the resulting resin composition (a resin composition powder of 24 mesh-pass and 60 mesh-on was used) was in an amount of 25% by weight. The molecular weight distribution of the THF-soluble matter was measured to reveal that it had peaks at molecular weights of 4,000 and 34,000, respectively, had an Mn of 5,500, had an Mw of 130,000, and had an Mw/Mn of 24. The component with a molecular weight of not more than 10,000 was in an amount of 25% by weight. It was also confirmed that the Tg of the resin composition was 59° C. and the glass transition point $Tg_1$ of the component with a molecular weight of not more than 10,000, fractionated by GPC, was 58° C.

In the examples of the present invention, it was possible to obtain the desired binder resins used in toners in a shorter time than in the comparative examples. It was also possible to cost-advantageously produce the binder resins because the expensive radical polymerization initiators were not used at the time of the first-stage polymerization of low-molecular components.

PREPARATION EXAMPLE 1

After the provisional mixing of 100 parts by weight of the resin composition of Example 1, 80 parts by weight of a magnetic material, 4 parts by weight of a low-molecular weight polypropylene and 2 parts by weight of a positive-chargeability controlling agent, the resulting mixture was heat-kneaded, and the heat-kneaded product was cooled. From the resulting cooled product (a toner material). a toner was prepared using a fine grinding mill and a classifier.

The toner material showed a very good grindability, so that the throughput was 14.1 kg/hr when a toner of a volume average particle diameter of 8.5μ in terms of pulverized particle size was obtained. No fusion of the toner material occurred in the grinding mill.

A developer obtained by mixing 0.5 part by weight of hydrophobic silica in 100 parts by weight of the above toner was fed to a copying machine NP-4835, manufactured by Canon Inc., and image formation and fixing properties of the toner were evaluated. A durability test was carried out using a large number of sheets of copying paper in a high-temperature high-humidity environment of a temperature of 32.5° C. and a humidity of 90% RH. As a result, stable and good images were produced. The fixing properties were also very good, and also no filming or fusing of the toner to a photosensitive member occurred.

PREPARATION EXAMPLE 2

Preparation Example 1 was repeated except for using the resin composition of Example 2. As a result, substantially the same results as in Preparation Example 1 were obtained.

PREPARATION EXAMPLES 3 TO 5 AND COMPARATIVE PREPARATIONS EXAMPLES 1 AND 2

Preparation Example 1 was repeated except for using the resin compositions of Examples 3, 4 and 5, respectively (Preparation Examples 3 to 5). on the other hand, Preparation Example 1 was also repeated to prepare toners, except for using the polystyrene used in Example 1, and using the resin compositions of Comparative Examples 1 and 2, respectively (Comparative Preparation Examples 1 to 2).

EVALUATION METHOD

The grindability of the toner materials was evaluated on the basis of the throughput per unit time, achieved under air pressure of 5.5 kg/cm$^2$ using a fine grinding mill that utilizes jet air currents. At the same time, the inner wall of the fine grinding machine was observed to examine whether or not the fusing of toners had occurred.

The fixing properties of toners, the toner image quality of toners and the durability were examined using a copying machine NP-4835, manufactured by Canon Inc.

In respect of the fixing properties, images obtained were rubbed about 10 times in reciprocation under a load of 100 g, using lens cleaning paper "Dusper" (trademark), and peeling of images was expressed by the rate of decrease (%) in reflection density. The toner image was evaluated at 200th sheet when images were continuously produced on 200 sheets.

In regard to the grindability of toner materials, the throughputs of toners per unit time are shown in the following table.

|  | Toner throughput per unit time (kg/hr) |
|---|---|
| Preparation Example 1: | 14.1 |
| Preparation Example 2: | 12.6 |
| Preparation Example 3: | 14.4 |
| Preparation Example 4: | 12.1 |
| Preparation Example 5: | 12.3 |
| Comparative Preparation Example 1: | 14.0 |
| Comparative Preparation Example 2: | 13.8 |

As in the above, Preparation Examples 1 to 5 and Comparative Preparation Examples 1 and 2 show a good grindability of toner materials. However, the toners of Comparative Preparation Examples 1 and 2 resulted in a little lower image density than Preparation Examples 1 to 5 in image production tests carried out under conditions of high-temperature and high-humidity of a temperature of 32.5° C. and a humidity of 90% RH. In the durability test carried out using a large number of sheets of copy paper in a high-temperature high-humidity environment, the toners of Comparative Preparation Examples 1 and 2 tended to cause more filming to the photosensitive member than the toners of Preparation Examples 1 to 5.

The toners of Preparation Examples 1 to 5 had superior fixing properties to the heat roller and superior offset resistance, and also caused no wind-around of transfer sheets to the heat roller.

EXAMPLE 6

In an autoclave equipped with a stirrer, 50 parts by weight of cumene and 100 parts by weight of styrene monomer were introduced, and heated at a temperature of 280° C. for 3 hours to carry out thermal polymerization without use of a radical polymerization initiator. After the thermal polymerization was completed, the cumene was removed under reflux. The resulting polystyrene was capable of dissolving in THF, had an Mw of 3,700, had an Mw/Mn of 2.5, had a main peak at a molecular weight of 3,500 as measured by GPC, and had a Tg of 58° C.

The above polystyrene in an amount of 30 parts by weight was dissolved in the following polymerizable monomer mixture to give a mixed solution.

| Monomer mixture | Mixing proportion (parts by weight) |
|---|---|
| Styrene monomer | 54 |
| n-Butyl acrylate monomer | 16 |
| Divinylbenzene | 0.06 |
| Benzoyl peroxide | 1.4 |

In the above mixed solution, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of polystyrene and a styrene/n-butyl acrylate copolymer. In the resin composition, the polystyrene and the styrene/n-butyl acrylate copolymer were in a uniformly mixed state. The THF-insoluble matter in the resulting resin composition was in an amount of 2% by weight.

The molecular weight distribution of the THF-soluble matter was measured to reveal that it had peaks at molecular weights of 4,000 and 34,000, respectively, had an Mn of 5,500, had an Mw of 130,000, and had an Mw/Mn of 24. The component with a molecular weight of not more than 10,000 was in an amount of 30% by weight ($W_1$), the component with a molecular weight of not less than 500,000 was in an amount of 20% by weight ($W_2$), and $W_2/W_1$ was 0.66. It was also confirmed that the Tg of the resin composition was 59° C. and the glass transition point $Tg_1$ of the component with a molecular weight of not more than 10,000, fractionated by GPC, was 58° C.

EXAMPLE 7

In an autoclave equipped with a stirrer, 50 parts by weight of cumene, 95 parts by weight of styrene monomer and 5 parts by weight of α-methylstyrene monomer were introduced, and heated at a temperature of 260° C. for 3 hours to carry out thermal polymerization without use of a radical polymerization initiator. After the thermal polymerization was completed, the cumene was removed under reflux. The resulting styrene/α-methylstyrene copolymer had an Mw of 4,500, had an Mw/Mn of 2.7, had a main peak at a molecular weight of 4,400 in the chart of GPC, and had a Tg of 64° C.

The above styrene/α-methylstyrene copolymer in an amount of 30 parts by weight was dissolved in the following monomer mixture to give a mixed solution.

| Monomer mixture | Mixing proportion (parts by weight) |
| --- | --- |
| Styrene monomer | 55 |
| 2-Ethylhexyl acrylate | 15 |
| Benzoyl peroxide | 1.4 |

In the above mixed solution, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of a styrene/α-methylstyrene copolymer and a styrene/2-ethylhexyl acrylate copolymer. In the resin composition, no THF-insoluble matter was present.

The molecular weight distribution of the THF-soluble matter was measured to reveal that it had peaks at molecular weights of 5,000 and 42,000, respectively, had an Mn of 6,200, had an Mw of 130,000, and had an Mw/Mn of 21. The component with a molecular weight of not more than 10,000 was in an amount of 25% by weight ($W_1$), the component with a molecular weight of not less than 500,000 was in an amount of 7% by weight ($W_2$), and $W_2/W_1$ was 0.28. It was also confirmed that the Tg of the resin composition was 58° C. and the glass transition point $Tg_1$ of the component with a molecular weight of not more than 10,000, fractionated by GPC, was 60° C.

EXAMPLE 8

In an autoclave equipped with a stirrer, 50 parts by weight of cumene, 90 parts by weight of styrene monomer and 10 parts by weight of methyl methacrylate monomer were introduced, and heated at a temperature of 270° C. for 3 hours to carry out thermal polymerization. After the thermal polymerization was completed, the cumene was removed under reflux. The resulting styrene/methyl methacrylate copolymer had an Mw of 3,900, had an Mw/Mn of 2.7, had a main peak at a molecular weight of 4,100, and had a Tg of 61° C.

The above styrene/methyl methacrylate copolymer in an amount of 40 parts by weight was dissolved in the following monomer mixture to give a mixed solution.

| Monomer mixture | Mixing proportion (parts by weight) |
| --- | --- |
| Styrene monomer | 38 |
| n-Butyl methacrylate monomer | 22 |
| Benzoyl peroxide | 0.65 |
| tert-Butylperoxy-2-ethylhexanoate | 0.85 |

In the above mixed solution, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of a styrene/methyl methacrylate copolymer and a styrene/n-butyl methacrylate copolymer. In the resin composition, no THF-insoluble matter was present.

The molecular weight distribution of the THF-soluble matter was measured to reveal that it had peaks at molecular weights of 4,000 and 43,000, respectively, had an Mn of 5,900, had an Mw of 92,000, and had an Mw/Mn of 16. The component with a molecular weight of not more than 10,000 was in an amount of 32 by weight ($W_1$), the component with a molecular weight of not less than 500,000 was in an amount of 9% by weight ($W_2$), and $W_2/W_1$ was about 0.28. It was also confirmed that the Tg of the resin composition was 60° C. and the glass transition point $Tg_1$ of the component with a molecular weight of not more than 10,000, fractionated by GPC, was 58° C.

EXAMPLE 9

In an autoclave equipped with a stirrer, 50 parts by weight of cumene and 100 parts by weight of styrene monomer were introduced, and heated at a temperature of 280° C. for 3 hours to carry out thermal polymerization. After the thermal polymerization was completed, the cumene was removed under reflux. The resulting polystyrene was capable of dissolving in THF, had an Mw of 3,700, had an Mw/Mn of 2.5, had a main peak at a molecular weight of 3,500 as measured by GPC, and had a Tg of 58° C.

The above polystyrene in an amount of 30 parts by weight was dissolved in the following monomer mixture to give a mixed solution.

| Monomer mixture | Mixing proportion (parts by weight) |
| --- | --- |
| Styrene monomer | 55 |
| n-Butyl acrylate monomer | 15 |
| tert-Butylperoxy-2-ethylhexanoate | 1.6 |

In the above mixture, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of polystyrene and a sytrene/n-butyl acrylate copolymer. In the resin composition, no THF-insoluble matter was present.

The molecular weight distribution of the THF-soluble matter was measured to reveal that it had peaks at molecular weights of 4,000 and 70,000, respectively, had an Mn of 5,800, had an Mw of 100,000, and had an Mw/Mn of 17. The component with a molecular weight of not more than 10,000 was in an amount of 21% by weight ($W_1$), the component with a molecular weight of not less than 500,000 was in an amount of 10% by weight ($W_2$), and $W_2/W_1$ was about 0.48. It was also confirmed that the Tg of the resin composition was 56° C. and the glass transition point $Tg_1$ of the component with a molecular weight of not more than 10,000, fractionated by GPC, was 56° C.

EXAMPLE 10

In an autoclave equipped with a stirrer, 30 parts by weight of cumene and 100 parts by weight of styrene monomers were introduced, and heated at a temperature of 225° C. for 4 hours to carry out thermal polymerization. After the thermal polymerization was completed, the cumene as removed under reflux. The resulting polystyrene had an Mw of 6,900, had an Mw/Mn of 2.2, had a main peak at a molecular weight of 7,100, and had a Tg of 76° C.

The above polystyrene in an amount of 30 parts by weight was dissolved in the following monomer mixture to give a mixed solution.

| Monomer mixture | Mixing proportion (parts by weight) |
| --- | --- |
| Styrene monomer | 52 |
| n-Butyl acrylate monomer | 18 |
| Benzoyl peroxide | 1 |
| tert-Butylperoxy-2-ethylhexanoate | 0.8 |

In the above mixture, 170 parts by weight of water in which 0.1 part by weight of partially saponified polyvinyl alcohol was dissolved was added to give a suspension dispersion. This dispersion was added in a reaction vessel containing 15 parts by weight of water and substituted with nitrogen, and suspension polymerization was carried out at reaction temperatures of from 70° to 95° C. for 6 hours. After completion of the reaction, the reaction mixture was filtered, dehydrated and dried to give a resin composition comprised of polystyrene and a styrene/n-butyl acrylate copolymer. In the resin composition, no THF-insoluble matter was present.

The molecular weight distribution of the THF-soluble matter was measured to reveal that it had peaks at molecular weights of 7,500 and 43,000, respectively, had an Mn of 6,500, had an Mw of 100,000, and had an Mw/Mn of 15. The component with a molecular weight of not more than 10,000 was in an amount of 18% by weight ($W_1$), the component with a molecular weight of not less than 500,000 was in an amount of 9% by weight ($W_2$), and $W_2/W_1$ was 0.5. It was also confirmed that the Tg of the resin composition was 61° C. and the glass transition point $Tg_1$ of the component with a molecular weight of not more than 10,000, fractionated by GPC, was 70° C.

What is claimed is:

1. A toner for developing an electrostatic image comprising a binder resin and a colorant or a magnetic material, said binder resin being prepared by the steps of polymerizing (a) an ethylenically unsaturated monomer or (b) a mixture of ethylenically unsaturated monomers (i) in the absence of a first radical polymerization initiator or (ii) in the presence of less than about 0.1% by weight of (a) or (b) of a first radical polymerization initiator to form a polymer or copolymer having a peak in the region of a molecular weight of from 2,000 to 10,000 in the molecular weight distribution measured by gel permeation chromatography (GPC), a weight average molecular weight/number average molecular weight (Mw/Mn) of $\leq 3.5$, and Tg $\geq 50°$ C. and containing reduced amounts of fragments of said first radical polymerization initiator bonded to molecular chain terminals of the polymer or copolymer, and dissolving the resulting polymer of copolymer in a polymerizable monomer to carry out solution polymerization or suspension polymerization in the presence of a second radical polymerization initiator, wherein the amount of the first radical polymerization initiator used for forming said polymer or copolymer is smaller than the amount of the second radical polymerization initiator employed in said solution polymerization or suspension polymerization, thereby preparing a resin composition, wherein said resin composition:

contains not more than 70% by weight of a tetrahydrofuran (THF)-insoluble matter:

has an Mw/Mn of $\geq 5$, at least one peak in the region of a molecular weight of from 2,000 to 10,000 and at least one peak or shoulder in the region of a molecular weight of from 15,000 to 100,000, in the molecular weight distribution measured by GPC of a THF-soluble matter; and contains a compound with a molecular weight of not more than 10,000 in an amount of from 10 to 50% by weight based on the resin composition.

2. The toner according to claim 1, wherein the polymerization of the ethylenically unsaturated monomer or monomers is thermal polymerization.

3. The toner according to claim 2, wherein said thermal polymerization is carried out at a temperature of from 150° to 300° C.

4. The toner according to claim 2, wherein said thermal polymerization is carried out at a temperature of from 200° to 300° C.

5. The toner according to claim 2, wherein said thermal polymerization is carried out under application of pressure.

6. The toner according to claim 2, wherein said thermal polymerization is carried out in the presence of less than 0.1% by weight of a first radical polymerization initiator.

7. The toner according to claim 2, wherein said polymer or copolymer obtained by thermal polymerization is dissolved in an amount of from 10 to 120 parts by weight based on 100 parts by weight of said polymerizable monomer.

8. The toner according to claim 2, wherein said polymer or copolymer obtained by thermal polymerization is dissolved in an amount of from 20 to 100 parts by weight based on 100 parts by weight of said polymerizable monomer.

9. The toner according to claim 1, wherein the polymerization of the ethylenically unsaturated monomer or monomers is thermal polymerization, and a polymer or copolymer obtained by said thermal polymerization is dissolved in a polymerizable monomer to carry out suspension polymerization, thereby preparing a resin composition.

10. The toner according to claim 9, wherein said resin composition contains a THF-insoluble matter in an amount of 10 to 70% by weight.

11. The toner according to claim 9, wherein said polymer or copolymer obtained by thermal polymerization is dissolved in a solution containing a polymerizable monomer, a second cross-linking agent and a polymerization initiator.

12. The toner according to claim 11, wherein said cross-linking agent comprises divinylbenzene.

13. The toner according to claim 1, wherein said resin composition contains a component with a molecular weight of not more than 10,000 and a component with a molecular weight of not less than 500,000 in a ratio of $W_2/W_1$ of from 0.05 to 2.0, where $W_1$ is the % by weight of the component with a molecular weight of not more than 10,000 and $W_2$ is the % by weight of the component with a molecular weight of not less than 500,000.

14. The toner according to claim 13, wherein said ratio of $W_2/W_1$ is from 0.1 to 2.0.

15. The toner according to claim 13, wherein said component with a molecular weight of not more than 10,000 is contained in an amount of from 20 to 39% by weight.

16. The toner according to claim 1, wherein the ethylenically unsaturated monomer is a vinyl monomer selected from the group consisting of styrene, substituted styrene, monocarboxylic acids having a double bond, acrylonitrile, methacrylonitrile, acrylamide, dicarboxylic acids having a double bond, vinyl esters, vinyl ketones and vinyl ethers.

17. The toner according to claim 1, wherein the solution polymerization is carried out in the presence of 0.4 to 15 parts by weight of the second radical polymerization initiator based on 100 parts by weight of the polymerizable monomer.

18. The toner according to claim 1, wherein the solution polymerization is carried out in the presence of 0.5 to 10 parts by weight of the second radical polymerization initiator based on 100 parts by weight of the polymerizable monomer.

* * * * *

UNITED STATES PATENT AND TRADEMARK OFFICE
CERTIFICATE OF CORRECTION

PATENT NO. : 5,321,091
DATED : June 14, 1994
INVENTOR(S) : YOSHIHIKO HIYOUSU, ET AL.

Page 1 of 3

It is certified that error appears in the above-identified patent and that said Letters Patent is hereby corrected as shown below:

COLUMN 2

Line 4, "ends" should read --tends-- and
   Line 18, "e.g.," should read --(e.g.,--.
   Line 40, "No. 6-158340" should read --No. 56-158340--.
   Line 64, "the" should be deleted.

COLUMN 3

Line 12, "No. 60-66958" should read --No. 166958--.
   Line 15, "eight" should read --weight--.

COLUMN 4

Line 21, "or" should read --for--.

COLUMN 6

Line 57, "of a very small" should read --as little--.

COLUMN 7

Line 7, "2.0 by" should read --2.0% by--.
   Line 8, "he" should read --the--.
   Line 13, "o" should read --or--.

COLUMN 9

Line 10, "includes" should read --include--.
   Line 58, "The" should read --the--.

UNITED STATES PATENT AND TRADEMARK OFFICE
CERTIFICATE OF CORRECTION

PATENT NO. : 5,321,091
DATED : June 14, 1994
INVENTOR(S) : YOSHIHIKO HIYOUSU, ET AL.

It is certified that error appears in the above-identified patent and that said Letters Patent is hereby corrected as shown below:

COLUMN 10

Line 54, "toner of a toner," should read --toner,--.

COLUMN 11

Line 45, "nd" should read --and--.

COLUMN 14

Line 43, "is" should read --are--.

COLUMN 15

Line 47, "0 7/1." should read --0.7/1.--.

COLUMN 16

Line 10, "e" should read --a--.

COLUMN 18

Line 40, "eight" should read --weight--.

COLUMN 21

Line 2, "PREPARATIONS" should read --PREPARATION--.

COLUMN 25

Line 8, "as" should read --was--.
Line 66, "of" should read --or--.

UNITED STATES PATENT AND TRADEMARK OFFICE
CERTIFICATE OF CORRECTION

PATENT NO. : 5,321,091
DATED : June 14, 1994
INVENTOR(S) : YOSHIHIKO HIYOUSU, ET AL.

It is certified that error appears in the above-identified patent and that said Letters Patent is hereby corrected as shown below:

COLUMN 26

Line 60, "a second cross-linking agent and a poly-" should read --a cross-linking agent and a second poly- --.

Signed and Sealed this

Twenty-ninth Day of November, 1994

Attest:

BRUCE LEHMAN

Attesting Officer     Commissioner of Patents and Trademarks